L. B. BELKNAP.
Combined Garden and Lawn Rake.
No. 227,951.　　　　　　　　　Patented May 25, 1880.
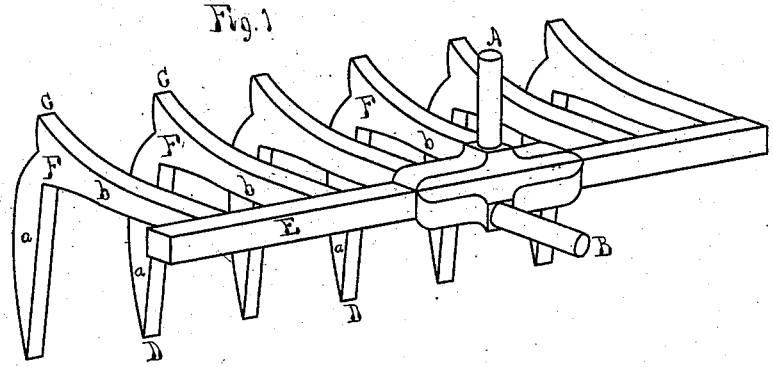
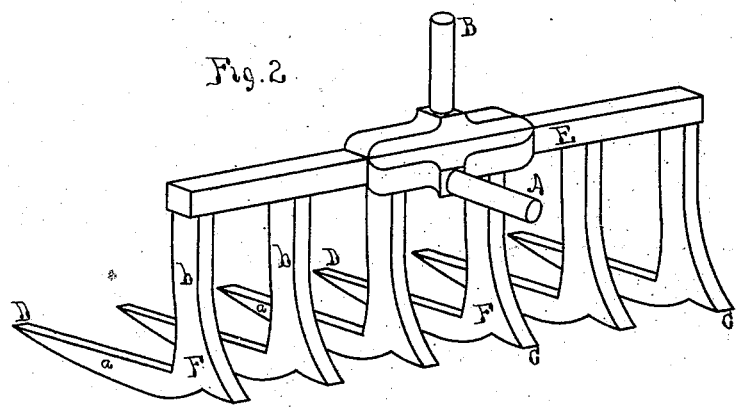
Witnesses
Geo. R. Fowler
Geo M. Chase
Inventor
Lewis B. Belknap

UNITED STATES PATENT OFFICE.

LEWIS B. BELKNAP, OF BOSTON, MASSACHUSETTS.

COMBINATION GARDEN AND LAWN RAKE.

SPECIFICATION forming part of Letters Patent No. 227,951, dated May 25, 1880.

Application filed October 2, 1878.

*To all whom it may concern:*

Be it known that I, LEWIS B. BELKNAP, of Boston, in the county of Suffolk and Commonwealth of Massachusetts, have invented a new and useful Combination Garden and Lawn Rake, of which the following is a specification.

The invention relates to a combination garden and lawn rake to be used either in a garden or upon a lawn, or in raking over any surface.

Heretofore the ordinary garden-rake has been too sharp to use on a lawn, except with great care and trouble, as there is danger that the teeth will penetrate too deeply into and among the roots of the grass and tear and injure the same. Besides, from the shape of the teeth, ordinarily long and sharp, they clog easily with dead grass and roots, and can only be cleaned with the hand, which renders their use upon a lawn slow and laborious.

The object of my invention is to provide a combination rake of wood, cast or forged steel, or cast or forged iron, or any other suitable material, which shall work equally well upon a lawn or in a garden, or elsewhere, one side being a garden-rake, and by reversing the handle by a single process the other side is a lawn-rake, and while reversed and used as a lawn-rake the garden-rake teeth act as regulators or guards to the lawn-rake teeth, the lawn-rake teeth riding upon the garden-rake teeth, thus conforming to the surface of the ground and preventing the teeth from penetrating too far into the ground among the roots of the grass and tearing and injuring the same.

The invention consists in the construction of a rake so that upon the back of the garden-rake teeth are short nubs or projections, which constitute, when the rake is reversed, the lawn-rake teeth, and so made that when so reversed and used as a lawn-rake the garden-rake teeth act as guards or riders for the lawn-rake teeth, and prevent them from penetrating too deep into the ground and injuring the roots of the grass, and the lawn-rake teeth are constructed so short and of that shape that they will not clog, and roots or dried grass collecting before or upon the same will immediately drop off when the rake is raised from the ground and without touching the same with the hand.

In the accompanying drawings, Figure 1 is the perspective of a rake embodying my invention, showing it as when used as a garden-rake, the points D of the compound teeth F being the operative points when used in this position. Fig. 2 shows a perspective view of my rake when in the position of use as a lawn-rake, the branches *b b* and the points C C of the compound teeth F being the operative points in this position, while the branch *a* and the point D of each tooth act as a rider upon the surface of the ground to prevent the teeth C C from entering the ground too far.

I claim as new and of my invention—

1. The compound rake-tooth F, constructed with the branches *a* and *b* and the points C and D, substantially as described.

2. In a rake-head, the combination of the compound tooth F, the cross-bar E, and a shank or handle, A and B, substantially as described.

3. A rake-head consisting of a cross-piece, E, a double shank or attachment for the handle in two positions, and a series of teeth having two branches and two points, constructed to operate substantially as and for the purposes described.

4. In a hand-rake, the teeth F, provided with a recurve or guard, C, forming an integral part of the tooth itself, substantially as described.

LEWIS B. BELKNAP.

Witnesses:
GEO. R. FOWLER,
GEO. M. CHASE.